US005495651A

United States Patent [19]

Tsuha

[11] Patent Number: 5,495,651

[45] Date of Patent: Mar. 5, 1996

[54] HAND TOOL FOR REMOVING HOSES

[76] Inventor: Kurtis K. Tsuha, 91-920 Laaulu St.; Unit A, Ewa Beach, Hi. 96706

[21] Appl. No.: 334,045

[22] Filed: Nov. 4, 1994

[51] Int. Cl.$^{6}$ .................................................. B23P 19/02

[52] U.S. Cl. ................................ 29/235; 29/237; 29/267; 254/25

[58] Field of Search ............................ 29/234, 235, 237, 29/267, 270, 278; 81/438; 254/25

[56] References Cited

U.S. PATENT DOCUMENTS

| | | | |
|---|---|---|---|
| D. 256,442 | 8/1980 | Martin . | |
| 457,526 | 8/1891 | Daly . | |
| 743,183 | 11/1903 | Miller et al. . | |
| 758,017 | 4/1904 | Parish | 254/25 |
| 1,130,147 | 3/1915 | Coles . | |
| 1,230,123 | 6/1917 | Connelly . | |
| 1,589,683 | 6/1926 | Clinger . | |
| 1,961,050 | 5/1934 | Johnson . | |
| 2,186,333 | 1/1940 | Giersch . | |
| 2,498,458 | 2/1950 | Schwork . | |
| 2,682,414 | 7/1954 | Richardson | 81/438 |
| 3,061,915 | 11/1962 | Puryear . | |
| 3,698,689 | 10/1972 | Poskin . | |
| 4,240,192 | 12/1980 | Davis | 29/278 |
| 4,776,246 | 10/1988 | Elliston . | |
| 4,780,942 | 11/1988 | Bernat . | |
| 5,014,409 | 5/1991 | Hippach . | |
| 5,054,180 | 10/1991 | Combs . | |
| 5,077,879 | 1/1992 | Haviv . | |
| 5,079,791 | 1/1992 | Grech . | |

FOREIGN PATENT DOCUMENTS

| | | |
|---|---|---|
| 2166681 | 5/1986 | United Kingdom . |

*Primary Examiner*—Robert C. Watson
*Attorney, Agent, or Firm*—Michael I. Kroll

[57] ABSTRACT

A hand held tool for the removal of vacuum hoses includes a removable grasping handle portion. An elongated slender shaft portion has a free end connected to the removable handle portion and a working end. A sharp edged, tapered, U-shaped slot is disposed on the working end of the elongated slender shaft portion. The working end has a taper for working the tool behind a hose which has its end pressed against a flush wall. A double fulcrum is provided to give a large mechanical advantage during early part of the pry to break a rubber hose free and then a smaller mechanical advantage during a later part of the pry to remove the hose more rapidly. Sharp edged, non-chamfered edges increase the surface contact area of the end of a hose and has a removable grasping handle. The sharp edged U-shaped slot for surrounds a significant portion of an exposed end of a hose so as to apply shear-type removal stress as near as possible to a frictionally resistive tube inserted in the hose.

2 Claims, 1 Drawing Sheet

HAND TOOL FOR REMOVING HOSES

BACKGROUND OF THE INVENTION

1. Field of the Invention

The present invention relates to a hand held tool. More particularly, the present invention relates to a hand held tool for the removal of vacuum hoses. The field of automotive maintenance is seen as the most obvious benefactor from the unique advantages of this invention. More generally, any machinery having flexible hoses slipped over and attached to tubular stub fittings could use this invention to improve the ease with which the hoses could be replaced.

Thus it can be seen that the potential fields of use for this invention are myriad, and the particular preferred embodiment described herein is in no way meant to be limiting the particular field chosen for exposition of the details of the invention.

2. Description of the Prior Art

The removal of rubber hoses from tubes has always been difficult. Pulling the hose directly does not work because the exertion of tension on the hose tends to contract its diameter thus causing it to grip the tube more tightly. The action is similar to the common children's toy known as a finger trap. When the tube is a stub pipe extending from a wall the problem is made more severe because it is difficult to get behind the hose to pry it off, particularly without damaging the hose, the pipe, or both. Often it becomes necessary to actually cut the hose longitudinally to unwrap it from the pipe. There have been numerous hand tools provided in the prior art that are adapted for prying apart various objects. The mostc obvious examples are the common claw hammer and the crowbar. While these units may be suitable for the particular purpose to which they address, they are generally not as suitable for the purposes of the present invention as described hereinafter.

The following known prior art, discovered at the United States Patent Office, is discussed so as to satisfy the duty to disclose all pertinent information and provide a contrast to the unique features of the instant invention. As will be seen, the simplicity and effectiveness of my invention is not rivaled in the prior art.

U.S. Pat. No. 2,470,309 to Hepp relates to a clip retaining tool. The mounting of clips and similar elements for the installation of conductors, conduits and the like have been a rather slow process due to the difficulty involved in holding the clip and conductor in position while applying the nut to the supporting bolt. Hepp teaches a tool body 10 which is formed of a bar of metal or equivalent material shaped to provide an elongated, round shank 12, having fixed on one end thereof a handle grip 14. At the opposite end, the tool body is shaped to provide a holder engaging portion or claw 16 and constituting a flattened part directed at an oblique angle from the shank 12. In the outer end of part 16 is provided a longitudinally directed elongated slot 18, having parallel side walls joining an arcuate bight 20. At their outer extremities the side walls of the slot have bevelled faces 22 diverging outwardly of the claw. This construction provides a bifurcation having a thickness substantially less than the diameter of the shank 12, but having sufficient thickness for the formation within the side and end curved walls of the slot of screw threads 24. From the end of the shank 12, to the slotted or bifurcated part, the portion 16 has outwardly converging oppositely disposed bevelled faces 26 for application of the tool. The patented tool does not show any sort of dual fulcrum for prying.

U.S. Pat. No. 2,842,017 to Watson relates to manually operated tools for extracting a wire from a shielded cable. Watson teaches a tool 10 that includes an elongated bulbous handle member 12 having a forwardly extending neck portion 14 of reduced diameter. The neck portion 14 is provided with an elongated axially extending bore 16 which terminates at its inner end in a second bore 18 of reduced diameter. The bore 18 receives therein the inner end of an elongated rod 20 which projects therefrom through and beyond the forward end of the neck 14. One end of an elongated substantially hollow tubular element is inserted within the bore 16 in concentric relation relative to the rod 20. The tubular element 22 projects beyond the forward end of the neck 14 for a distance shorter than the longitudinal axis of the rod 20. The patented tool does not show any sort of dual fulcrum for prying.

U.S. Pat. No. 3,481,226 to Caskey relates to a tool for relieving air entrapments encountered in connection with the building up of pneumatic tires. It is well known to build up tires on a radially expandable and contractible tire building drum by depositing the desired number of layers or plies on and around the drum and subsequently placing the tread strip on top of and around the outermost ply. It is also known that during the depositing of the relatively thick tread strip upon the adjacent ply it is unavoidable that air is entrapped between the tread strip and the adjacent ply. This air which is generally in the form of small individual bubbles has to be removed from the raw tire on the drum in order to prevent a faulty tire construction and the danger that, with the finished tire in operation, the tread strip accidentally detaches itself from the remainder of the tire. Therefore, it has been the common practice in the tire building art, following the deposit of the tread strip on the outermost ply, to introduce two flat blades or knives from opposite sides deep between the tread strip and the adjacent ply and while the drum is rotating, gradually to withdraw the blades or knives in opposite and axial direction of the drum to thereby allow the air entrapped between the tread strip and the adjacent ply to escape into the atmosphere. This practice however, has not proved satisfactory for the following reason. Unless considerable strength is exercised in holding the blade or knife still in spite of the frictional engagement of the rotating tread strip and ply or plies on the drum, the blades or knives jerk back and forth, and it is unavoidable that they will cut into either one or both, the adjacent ply and the tread strip. Also, when the blade or knife is not held in a certain position, but more or less inclined, a cutting of the blade into the tire components cannot be avoided. Caskey's patented device teaches a customary rotatable segmental tire building drum 1 which has placed thereon two carcass layers or plies 2 and 3 which extend all the way around the drum 1. Furthermore, a tread strip 4 is placed on and extends around the central area of the outermost ply 3. After the tread strip 4 has thus been placed upon the layer or ply 3, it is necessary to remove the air which during the deposit of the tread strip onto ply 3 has become entrapped between the tread strip and ply 3. The air relieving tools 5 are introduced from opposite sides between tread strip 4 and ply 3. Thereupon, while the drum 1 is being rotated in any convenient manner, the tools 5 are in opposite direction gradually withdrawn from between tread strip 4 and ply 3. The patented tool does not show any sort of dual fulcrum for prying.

U.S. Pat. No. 3,965,776 to Wolstenholme et al. relates to a tool for applying retainer clips. Present day automobile repair mechanics have found that installing windshield and rear window chrome trim pieces following auto body work has been hampered by the unavailability of a simple, practical tool for placing the trim retainer clips over the headed studs welded around the body window opening, the studs being permanently installed during the manufacture of the automobile. The major problem is the risk of damage to the glass windows themselves by scratches and chips inadvertently being applied to the edges of the glass adjacent the studs while the clips are being installed by makeshift implements. Since tempered glass is used in modern autos, the infliction of scratches or cracks on the edge of the glass usually necessitates replacement of the entire window, since the chips or cracks ultimately propagate through the entire glass panel. Auto body repairmen usually attempt to insert the clips over the studs by using a screwdriver or the like, and this usually involves first tapping one side of the clip over the stud and then the other. This has proven to be time consuming, exasperating and expensive, when a windshield or rear window becomes chipped or cracked as a result of this rather haphazard procedure. In many instances a sealant has been laced entirely around the window, and the sealant material prevents the repairman from clearly observing the precise location of the stud while he is attempting to drive the clip over same with a screwdriver. Needless to say, accidents and slips often occur. Since there are many studs in place about a typical window opening, requiring numerous clip installations in vertical, horizontal and inverted positions, it needs little imagination to conclude that a need for a simple retainer clip installing tool exists in this field. The patented tool includes a pair of pusher prongs extending longitudinally of the tool axis, which is parallel to the direction of clip installation (hereinafter referred to as the "forward direction"). The forward, inner sides of the prongs are cut away so as to terminate in the bevel surface at the rearward area of each undercut, which, with the pusher prongs, cooperate with the clip in the desired manner for enabling its forceful installation. The forward ends of the prongs are slightly offset from each other in a vertical sense to provide another important cooperating relationship between the tool and the clip. The prongs may be curved to enhance the facility with which the tool can be used. The patented tool does not show any sort of dual fulcrum for prying.

U.S. Pat. No. 5,054,180 issued Oct. 8, 1991, to Combs shows a hinge pin tool having a particular form and constructed to facilitate removing headed hinge pins from the hinges in uni-body automobile repairs. The tool is especially configured to receive and apply heavy, forceful blows being delivered at a spaced distance from the operator's hand to prevent injury. The patent does not show any sort of fulcrum for prying let alone a double fulcrum. Also the patent does not teach or contemplate a removable universal handle for different sized tools.

By contrast the instant invention features a double fulcrum to give a large mechanical advantage during early part of the pry to break a rubber hose free and then a smaller mechanical advantage during a later part of the pry to remove the hose more rapidly. The instant invention also shows a removable universal handle useful with different sized, but similar, pry tools.

U.S. Pat. No. 457,526 issued Aug. 11, 1891, to Daly shows a hand-held carton hook with a separable wrench-pry bar utility tool. The separate utility tool has a ring shaped center portion for attaching it to the carton hook, but this ring is in no way suitable or convenient for grasping or handling the tool. The wrench end of the utility tool is broadly U-shaped but it is not tapered for insertion behind a rubber hose end flush against a flat surface. This difference in structure is because the U-shaped end of the patented tool was never envisioned to be used as a pry bar but merely as a wrench. The pry bar section of the patented tool has a chamfered edge and is generally V-shaped.

By contrast, the instant invention has a U-shaped non-chamfered notch acting as a pry bar. In addition the pry bar of the instant invention has a double fulcrum to give a large mechanical advantage during early part of the pry to break a rubber hose free and then a smaller mechanical advantage during a later part of the pry to remove the hose more rapidly. The instant invention also shows a removable universal handle useful with different sized, but similar, pry tools.

U.S. Pat. No. 4,776,246 issued Oct. 11, 1988, to Elliston shows a hand-held combination screwdriver having a plastic handle that receives a reversible round steel driver with a flat blade screwdriver at one end and Phillips driver blades at its other end. An elongated channel or slot with side recesses is formed in the handle and receives both ends of the driver, and the side recesses are shaped to engage and lock the flat blade end of the driver without additional parts. A "U" shaped locking key at the bottom of the channel holds and locks the Phillips end of the driver and also defines a stop for the flat blade end. The patent does not show any sort of grooved pry tool with any sort of fulcrum let alone a double fulcrum.

By contrast the instant invention features a double fulcrum to give a large mechanical advantage during early part of the pry to break a rubber hose free and then a smaller mechanical advantage during a later part of the pry to remove the hose more rapidly.

U.S. Pat. No. 5,077,879 issued Jan. 7, 1992, to Haviv shows a hand tool for aiding in the detachment of one member from another member includes a pair of lever arms pivotally mounted to each other and carrying handles at one end, and bifurcated, Y-shaped prying elements at the other end such that pressing the handles together moves the prying elements apart. A spring normally urges the handles apart and thereby the prying elements together. The patent does not show any sort of pry bar fulcrum, any sharp edged U-shaped slots, or any sort of removable handle.

By contrast the instant invention features a double fulcrum to give a large mechanical advantage during early part of the pry to break a rubber hose free and then a smaller mechanical advantage during a later part of the pry to remove the hose more rapidly. In addition the instant invention features a sharp edged U-shaped slot for surrounding a significant portion of an exposed end of a hose and applying shear type removal pressure as near as possible to the frictionally resistive tube inserted in the hose.

U.S. Pat. No. 5,014,409 issued May 14, 1991, to Hippach shows a tool adapted for removing fuel injectors from the heads of diesel engines. A handle is attached to flat bar stock which is bent in the approximate shape of the letter J. Specific radii are used for the specific bends in order to provide clearance for the fuel injector and for clearing obstructions within the engine head area. A lower tool engagement portion has a semi-circular cut out for slipping about the body of the fuel injector. A pair of fingers extend about this semi-circular cut out for engaging a flange on the fuel injector body. Rocking the tool forces these extended fingers to lift the fuel injector out of its bore in the engine. The specific radii used in an intermediate portion between the tool engagement area and the handle are specifically adapted to provide clearance and sufficient leverage in order to remove the fuel injector from its bore. The patented tool does not show a removable handle for mounting on tools of various sizes. No taper is shown on the U-shaped notch portion of the pry bar for working the tool against the end of a flush object. The patented tool features a single arcuate fulcrum.

By contrast the instant invention features a double fulcrum to give a large mechanical advantage during early part of the pry to break a rubber hose free and then a smaller mechanical advantage during a later part of the pry to remove the hose more rapidly. Also, the instant invention is tapered to allow its insertion between the end portion of a hose and a flush wall against which it may be positioned. In further contrast, the instant invention has a removable handle suitable for use with similar, different sized, tools.

U.S. Pat. No. 1,961,050 issued to Johnson on May 29, 1934, shows a spike puller. The patent embodies in its structure a rocking fulcrum and a detachable claw for replacement with claws of different sizes. The handle portion and the fulcrum portion of the patented tool are integral and therefore the same fulcrum is used no matter what size claw is used. The patented tool has no teaching of a multiple fulcrum and the working portion of the pry bar is curved.

By contrast the removable grasping handle of the instant invention allows the pry tool, complete with its own predesigned fulcrums, to be exchanged with different size tools. In further contrast, the instant invention has multiple fulcrums' and a straight working portion.

U.S. Pat. No. 5,079,791 issued Jan. 14, 1992, to Grech shows a tool for unsnapping a snap fastener from and reattaching a snap fastener to a snap fastener base. The tool includes a wedge-shaped unsnapping end and a reattaching end having a recessed area for locating and pressing upon the head of a snap fastener. The unsnapping end includes a U-shaped slot having inclined interior walls. The unsnapping end is coated with a resilient, scratch-preventive plastic coating. The recessed area of the reattaching end is composed of a hard rubber. The tool may be composed of a plastic. The tool does not have a U-shaped notch at the pry bar end and the notch it does have is heavily chamfered so as to assist in wedging the snap fastener upward. There is no suggestion of a double fulcrum or a removable handle.

By contrast the instant invention features a double fulcrum to give a large mechanical advantage during early part of the pry to break a rubber hose free and then a smaller mechanical advantage during a later part of the pry to remove the hose more rapidly. By further contrast, the instant invention has sharp, non-chamfered edges to increase the surface contact area of the end of a hose and has a removable grasping handle. In further contradistinction, the instant invention features a sharp edged U-shaped slot for surrounding a significant portion of an exposed end of a hose and applying shear type removal pressure as near as possible to the frictionally resistive tube inserted in the hose.

U.S. Pat. No. 3,061,915 issued to Puryear on Nov. 6, 1962, shows a hose removal tool. Similar to the instant invention the tool is for removing a length of hose from a pipe. The patent recognizes the important fact that rubber hose contracts in diameter when pulled in tension and thus it becomes nearly impossible to simply pull a flexible hose off a pipe onto which it has been slipped. The invention is composed of a removable bar and handle which serves as both a grasping bar and a fulcrum for a Y-shaped pry bar portion. A taper for working against a flush wall is not shown or suggested. There is no suggestion of a double fulcrum nor is there any sharp edged U-shaped notch.

Unlike the other prior art discussed, this tool is intended for the same use as the instant invention. By contrast, the instant invention features a sharp edged U-shaped notch for presenting maximum surface area to the end of a hose while at the same time minimizing the chances of the inner edges of the tool from wedging against the pipe. By further contrast, the instant invention also has a double fulcrum and a taper for working against a flush wall. In contradistinction, the instant invention has a removable grasping handle which is used to hold tools of various sizes.

As can be seen, numerous innovations for prying apart parts have been provided in the prior art. Only one of these, U.S. Pat. No. 3,061,915 to Puryear, is specifically directed toward hose removing and that patent does not address removing a hose from a flush wall without damage to the tube or hose. Even though these innovations may be suitable for the specific individual purposes which they address, they would not be suitable for the purposes of the present invention. In particular, of the numerous prior art patents discussed, none show a sharp edged U-shaped notch for prying, none show a dual fulcrum arrangement, and none show a removable handle in combination with the first two items. The unique structure of the hand tool described herein is ideal for the specialized purpose which it addresses.

SUMMARY OF THE INVENTION

A hand held tool for the removal of vacuum hoses includes a removable grasping handle portion. An elongated slender shaft portion has a free end connected to the removable handle portion and a working end. A sharp edged, tapered, U-shaped slot is disposed on the working end of the elongated slender shaft portion. The working end has a taper for working the tool behind a hose which has its end pressed against a flush wall. A double fulcrum is provided to give a large mechanical advantage during early part of the pry to break a rubber hose free and then a smaller mechanical advantage during a later part of the pry to remove the hose more rapidly. Sharp edged, non-chamfered edges increase the surface contact area of the end of a hose and has a removable grasping handle. The sharp edged U-shaped slot surrounds a significant portion of an exposed end of a hose so as to apply shear-type removal stress as near as possible to a frictionally resistive tube inserted in the hose.

Accordingly, it is a principal object of the invention to provide a new and improved hose removal tool which overcomes the disadvantages of the prior art in a simple but effective manner.

It is a major object of this invention to provide a new and improved hand tool for the removal of vacuum hoses that is tapered so as to allow the wedging of the tool between a flush wall and the end of a hose without damage to the hose.

It is another object of this invention to provide a new and improved hand tool for the removal of vacuum hoses that has a U-shaped notch portion with parallel opposed side walls so as to prevent interfering contact with a pipe upon which the hose is slipped.

It is another object of this invention to provide a new and improved hand tool for the removal of vacuum hoses that has a U-shaped notch portion with parallel opposed side walls provided in a variety of sizes for matching many hoses and equipped with a single removable grasping handle.

It is another object of this invention to provide a new and improved hand tool for the removal of vacuum hoses that has a sharp edged U-shaped notch portion so as to maximize the surface contact area on the end of a hose.

It is another object of this invention to provide a new and improved hand tool for the removal of vacuum hoses that has a sharp edged U-shaped notch portion so as to apply shear type removal pressure as near as possible to the frictionally resistive tube inserted in the hose.

Another feature of the present invention is that the removable grasping handle portion contains a substantially square shaped blind bore for receiving the tool.

Another feature of the invention is the provision of a double fulcrum point on the claws so as to enhance the efficiency of the device. The double fulcrum gives a large mechanical advantage during early part of the pry to break a rubber hose free and then a smaller mechanical advantage during a later part of the pry to remove the hose more rapidly.

Finally, it is a general goal of the invention to provide improved elements and arrangements thereof in an apparatus for the purposes described which is inexpensive, dependable and fully effective in accomplishing its intended purposes.

It is submitted that the present invention meets or exceeds all the above objects and goals. Upon further study of the specification and appended claims, further objects and advantages of this invention will become apparent to those skilled in the art.

These and other objects of the present invention will become readily apparent upon further review of the following specification and drawings.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

LIST OF REFERENCE NUMERALS

Figure 1:
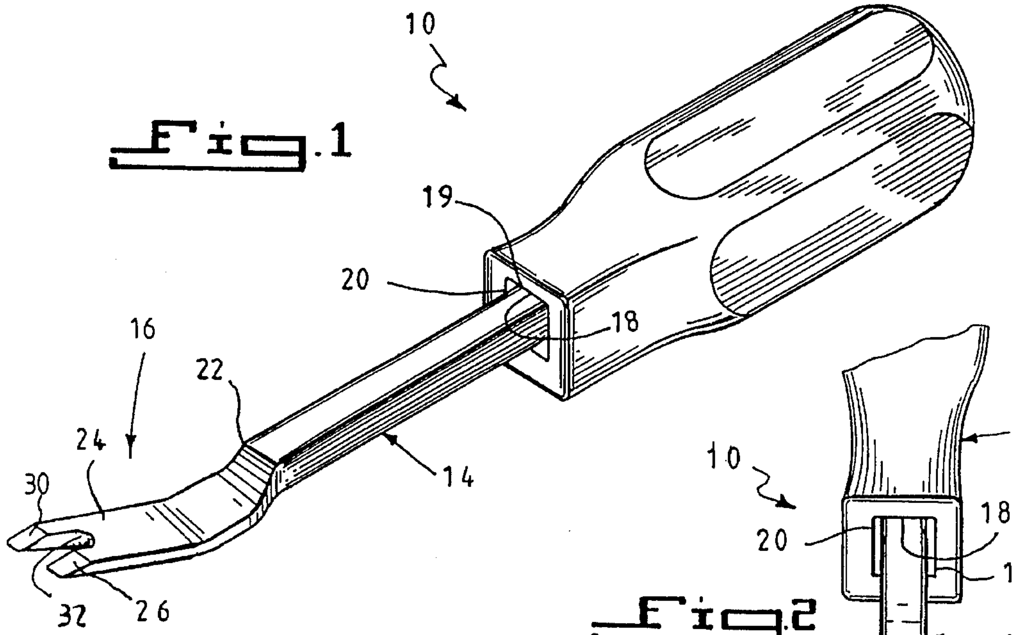
FIG. 1 is a perspective view of the hand tool for removal of vacuum hoses of the present invention.
Figure 2:
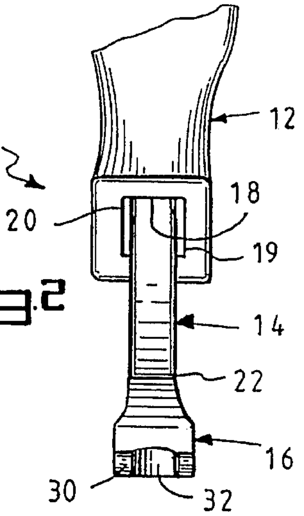
FIG. 2 is a partial front view of the hand tool shown in FIG. 1.

10—hand tool for the removal of vacuum hoses
12—removable handle portion of tool
14—elongated slender shaft of tool
16—pry bar portion of tool
18—blind bore in handle portion
19—compressive material to hold shaft in handle
20—substantially square opening in handle
22—shaft to pry bar transition
24—flat upper surface of pry bar portion
26—right prong taper
27—flat outer lower surface
28—flat intermediate lower surface
29—first fulcrum point
30—left prong taper
31—second fulcrum point
32—longitudinal U-shaped slot
33—semi-circular wall
38—interior wall of left prong
40—interior wall of right prong
42—user's hand
44—hose mounting tube
46—rubber vacuum hose
48—direction of hose removal arrow
50—direction of applied force arrow

DETAILED DESCRIPTION OF THE PREFERRED EMBODIMENT

The overall hand tool for the removal of vacuum hoses is indicated generally by the numeral 10 in the Figures. Tool 10 includes a removable handle portion 12 and an elongated slender shaft portion 14 with a pry bar portion 16 at one end.

Removable handle portion 12 contains a blind bore 18 which receives and holds the end of shaft 14 opposite pry bar portion 16. Compressed rubber 19 holds the reversible shaft 14 in place in the handle 12. The artisan will recognize other suitable conventional means, such as spring loaded balls, may be used to hold shaft 14 in blind bore 18. Shaft 14 is square in cross section, matching square bore 18, so as to be able to transmit torque directed along its length when a twisting moment is applied to handle 12. This action could be useful in breaking loose a rubber hose which has "frozen" itself to a mounting tube.

Referring to FIGS. 1 through 6, the hand tool for the removal of vacuum hoses of the present invention is shown generally at 10.

Figure 3:
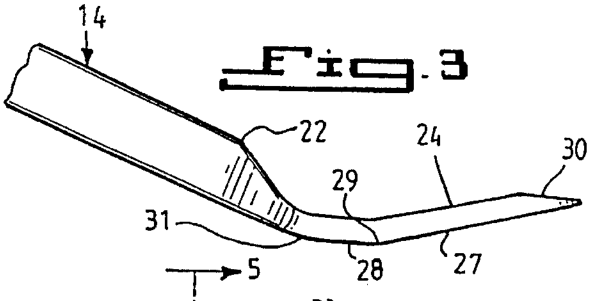
FIG. 3 is a partial side view of the hand tool shown in FIG. 1.
Figure 4:
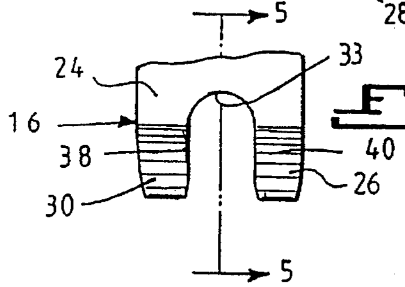
FIG. 4 is a partial plan view of the hand tool shown in FIG. 1.
Figure 5:
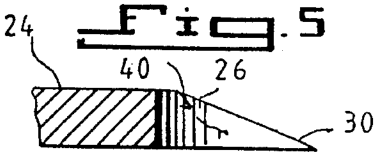
FIG. 5 is a cross-sectional view taken along line 5—5 of FIG. 4.

The details of the pry bar claw portion 16 can best be seen in FIGS. 3, 4, and 5. Pry bar portion 16 has a substantially flat upper surface 24. The plane of flat surface 24 makes an angle of about 120 degrees with the central longitudinal axis of slender shaft 14. This means the handle portion will be disposed at about 30 degrees from a planar surface from which a hose connection extends normally when the tool is in its working position. This 30 degree rise, from the work surface along the length of shaft 14, will give sufficient room for a user to grip and manipulate the tool in most work environments.

A pair of substantially parallel prongs, defining a longitudinal elongated slot 32, are located on the distal end of first claw portion 16. The ends of the tongs are tapered downwardly away from surface 24 at 26 and 30. This downward taper allows the prongs to be worked behind a hose which has been pushed flush against the work surface from which a mounting tube extends. Parallel inner walls 38 and 40 of the prongs merge tangentially with semi-circular wall 33 (FIG. 4) to form a "U" shaped slot 32 at the distal end of pry bar portion 16. Walls 38, 40, and 33 form sharp corners with upper surface 24 and the tapered portions 26 and 30 of the prongs. These corners are made as sharp as possible so as to avoid pinching a hose together as it is being pried loose. The non-chamfered sharp corners allow for the maximum possible tool surface to contact the end portion of a hose.

Referring now specifically to FIG. 3, the specially shaped lower surface of claw 16 will be described. The outer lower surface 27 of first claw 16 is substantially parallel to upper surface 24 for a substantial distance toward the handle. Thus, a relatively flat thin plate, broken by "U" shaped slot 32 and tapered at 26 and 30, is presented to the work. Flat angled bottom surface 28 meets bottom surface 27 at first fulcrum point 29. Further toward the handle, angled bottom surface 28 meets the bottom surface of shaft 14 at a second fulcrum point 31.

When the tool has been inserted behind a rubber hose and prying begins, the leverage is obtained about first fulcrum point 29. The leverage remains constant until angled surface 28 comes to rest on the supporting work surface. At that time the fulcrum point shifts from point 29 to second fulcrum point 31.

The artisan will recognize that the first fulcrum point 29 will act so as to achieve the most force amplification at the sacrifice of motion, whereas the second fulcrum point will act so as to achieve the most motion amplification at the sacrifice of force. Also during the time either fulcrum point is active, the force-motion characteristics are constant. The tool thus gives precisely the type of action desired to effectively remove a rubber hose. At first, when the hose is fully on the pipe, a large force is needed to overcome the high frictional forces. After the hose has been partially removed, the lower frictional forces do not require such a large force and the remaining hose should be removed quickly with a large motion amplification.

Figure 6:
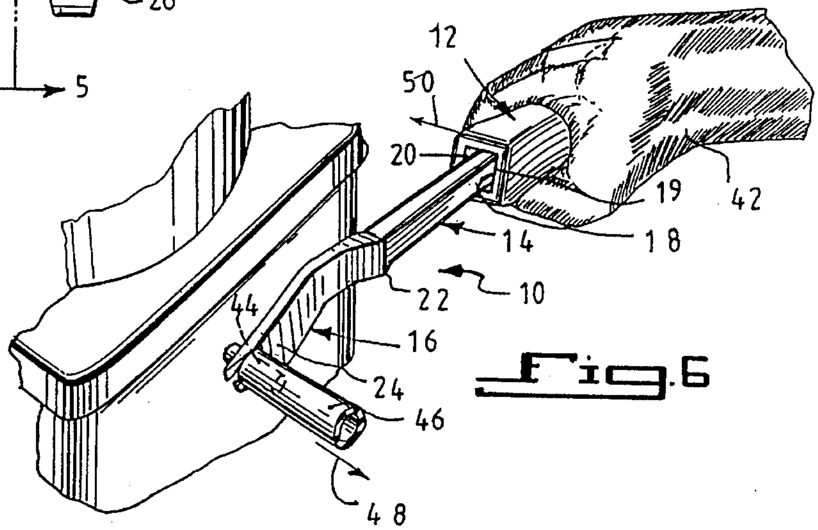
FIG. 6 is a perspective view of the hand tool shown in FIG. 1, being used to remove a typical vacuum hose.

In operation, as shown in FIG. 6, a user 42 grasps the handle 12 of the hand held tool 10 for the removal of vacuum hoses and inserts the claw portion 16 between the hose mounting tube 44 and the stubborn rubber vacuum hose 46. Tapers 26 and 30 are particularly useful in this first stage of the operation if the hose is flush against a wall. Hose mounting tube 44 enters longitudinal elongated slot 32. User 42 then pushes handle 12 in the direction of arrow 50 to pry bar 16 about fulcrum 29 to begin removal of vacuum hose 46 in the direction of arrow 48. After about 15 degrees of rotation about fulcrum 29, second fulcrum 31 will come into contact with the hose pipe support surface and the partially removed hose will be more quickly totally removed. Also important to the operation are sharp corners at the edges of slot 32. They serve to prevent pinching of the rubber hose against the mounting tube, and thereby increasing the friction, during removal. Also important, in certain instances, are the tapered end portions 26 and 30. They serve as a wedge for getting the slot around the mounting tube when there isn't enough room for the thickness of claw 16.

The parallel inside edges of the prongs of the U-shaped notch are important so as not to scratch, mar, or otherwise interfere with the mounting tube while removing the hose. If a removal of a different diameter hose from a tube is desired, it is contemplated that a different tool portion be inserted into removable grasping handle 12. In practice it is assumed that a series of different width tools from about one-eighth to three-eighths of an inch will be provided in a kit. Of course, it would be possible to also form the opposite end of shaft 14 with another, different sized, "U" shaped tool.

It will be understood that each of the elements described above, or two or more together, may also find a useful application in other types of constructions differing from the type described above.

While the invention has been illustrated and described as embodied in a hand held tool for the removal of vacuum hoses, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A hand held tool for prying a hose from a mounting pipe, comprising;

removable grasping handle means having a square blind bore;

an elongated slender shaft having a square end inserted into said square blind bore and a pry bar means disposed on the opposite end, said pry bar means comprising;

a substantially flat end portion having upper and lower surfaces;

a U-shaped slot cut into a distal end of said flat end portion to form a pair of substantially parallel prongs which are "U" shaped slot meeting said upper and lower surfaces of said flat portion at sharp corners so as to prevent pinching together of the hose as it is pried from the mounting tube;

double fulcrum means for improving the prying efficiency, said double fulcrum means comprising an intermediate flat lower surface and an inner flat lower surface, a first fulcrum means formed by a bend between said lower surface of said substantially flat end portion surface and said intermediate flat lower surface for providing a large force advantage during a first part of a prying action, a second fulcrum means formed by a bend between said intermediate flat lower surface and said inner flat lower surface for providing a large motion advantage during a second part of the prying action.

2. The tool of claim 1, further comprising;

resilient retaining means for releasably holding said square end of said shaft in said square blind bore.

* * * * *